G. E. STEPHENSON.
DRAIN VALVE.
APPLICATION FILED FEB. 25, 1914.

1,167,027.

Patented Jan. 4, 1916.

WITNESSES
Samuel Payne.
Max H. Srolovig

INVENTOR
G. E. Stephenson.
Henry C. Evert
ATTORNEYS

UNITED STATES PATENT OFFICE.

GEORGE E. STEPHENSON, OF SCIO, OHIO.

DRAIN-VALVE.

1,167,027.   Specification of Letters Patent.   Patented Jan. 4, 1916.

Application filed February 25, 1914. Serial No. 821,000.

*To all whom it may concern:*

Be it known that I, GEORGE E. STEPHENSON, a citizen of the United States of America, residing at Scio, in the county of Harrison and State of Ohio, have invented certain new and useful Improvements in Drain-Valves, of which the following is a specification, reference being had therein to the accompanying drawing.

This invention relates to drain valves and has for its primary object to provide a valve with means to enable the draining of a burst discharge pipe simultaneously with the closing of the water supply to the discharge pipe.

Further objects of the invention are to provide a drain valve which is simple in its construction and arrangement, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In describing the invention in detail, reference is had to the accompanying drawings wherein—

Figure 1:
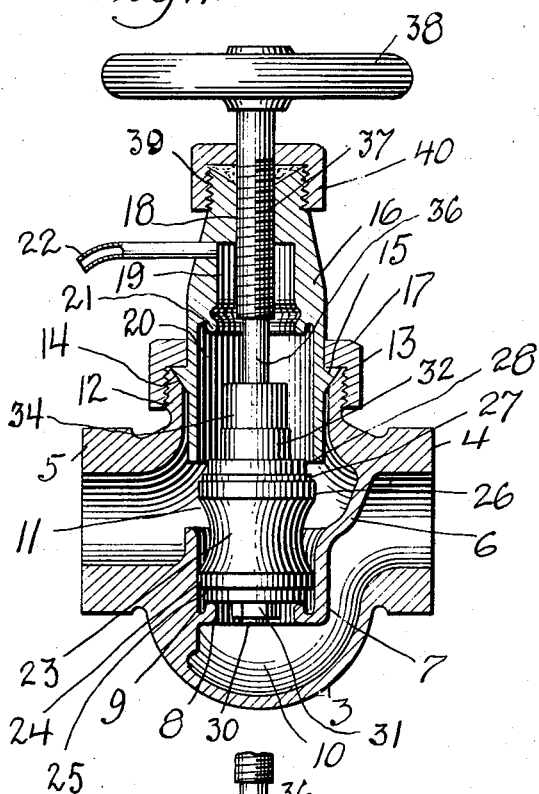
Figure 2:
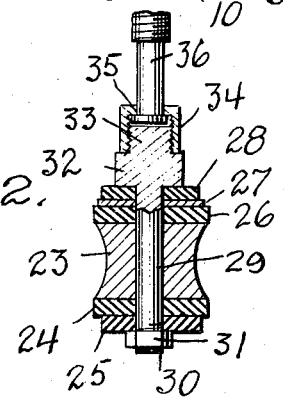

Figure 1 is a longitudinal sectional view of a drain valve in accordance with this invention; and, Fig. 2 is an enlarged sectional view of the valvular member.

Referring to the drawings in detail, 3 denotes a casing formed with an inlet nipple 4 and an outlet nipple 5. The casing 3 is provided with a partition 6, and one portion thereof is cylindrical in contour forming a cylindrical guide 7 for valvular member to be presently referred to. One end of the cylindrical portion 7 is provided with an inwardly extending flange 8, the latter being angle-shaped in cross section and provides a valve seat 9 within the cylinder 7. The partition 6 divides the casing 3 into an inlet chamber 10 and a valve chamber 11, and the cylinder 7 is interposed between chambers 10 and 11, with its axis at right angles with that of the nipples 4—5. The casing 3 is furthermore provided with a nipple 12 which opens into the chamber 11, is disposed at right angles with respect to the nipples 4—5, and is formed with peripheral threads 13 and an inwardly beveled edge 14.

Extending through the nipple 12 and formed with a peripherally beveled shoulder 15 is a tubular member 16. The shoulder 15 abuts against the edge 14, and engaging with said shoulder 15 and further engaging with the threads 13 is a flanged collar 17 for fixedly securing the tubular member 16 to the casing 3.

The tubular member 16 is formed with a longitudinal bore 18, and a recess 19 of greater diameter than the bore 18, and into which the said bore opens. The said member 16 is furthermore provided with a cylindrical chamber 20 having at its top a downwardly directed inclined annular flange 21 which constitutes a valve seat for the valve. Communicating with the recess 19 is a drain tube 22.

Normally arranged within the cylinder 7 and engaging the seat 9 is a valve consisting of a body portion 23, a washer 24 abutting against one end thereof, a seat washer 25 abutting against the washer 24 and of less diameter than said washer 24, a washer 26 abutting against the other end and of the same diameter as the washer 24, a gasket 27 abutting against the washer 26, a seat washer 28 abutting against the gasket 27 and which is of the same diameter as the washer 25, and a coupling bolt 29 extending through said washers, gasket and body portion, and projecting from the washer 25 with a threaded end 30, upon which is mounted a nut 31, the latter abutting against the washer 25. The bolt 29 is provided with a head 32 which abuts against the washer 28 and said head 32 is formed with a peripherally threaded projection 33, and engaging with the latter is an interiorly threaded flanged collar 34, for swivelly connecting the head 35 of the valve stem 36 to the valve. When the valve is in the cylinder 7, the washer 25 abuts against the seat 9, while the washer 24 snugly engages the wall of the cylinder 7. When the valve is adjusted into the chamber 20, the washer 26 snugly engages the wall of said chamber, and the washer 28 abuts against the seat 21, whereby communication is cut off between the recess 19 and the chamber 20.

The valve is adjusted through the medium of the stem 36, the latter being provided with peripheral threads 37 which engage with threads formed on the wall of the bore 18. The stem 36 projects from the member 16 and carries a hand wheel 38. A packing 39 is mounted upon the member 16 and is maintained in position by a flanged collar 40 having interior threads engaging with peripheral threads on the member 16.

When the valve is shifted clear of the cylinder 7, the water supplied to the chamber 10 can pass into the chamber 11 and be discharged therefrom. If the discharge pipe should burst and it is desired to drain such pipe, the valve is adjusted so that the washer 25 will engage the seat 9, when the water from the pipe will enter chamber 11, pass into chamber 20, thence into recess 19 and be discharged by the drain 22. If it be desired to open the water supply, the valve is shifted so that the washer 28 will engage the seat 21 and shut off communication to the drain 22. The chamber 20 formed by the cylindrical part of the hood 16 also constitutes a dash-pot, and it will be observed that this cylinder and the cylinder 7 are in alinement, and in such position that the valve at all times closes one or the other of these cylinders, so that in either opening or closing the valve the drain outlet is not subjected to the full force of the high pressure.

Other advantages will readily occur to those familiar with the art.

What I claim is:—

1. In a drain valve, the combination of a casing having an apertured partition, and a cylinder arranged concentrically with the aperture in the partition, a supplemental cylinder in the casing spaced from but alined with said first cylinder, and having at its end a valve seat and beyond this a waste port, a valve comprising two pistons adapted to fit respectively in said alined cylinders and provided with valve washers adapted to alternately engage the partition opening and the upper valve seat, whereby the high pressure fluid is prevented from reaching said waste port in either opening or closing the valve.

2. A drain valve comprising a casing having a perforated dividing partition with a valve seat, and a waste port communicating with the outlet side of the casing, a pair of cylinders below the waste port spaced apart and alined concentrically with said partition valve seat, a valve provided with a contact seat washer and with two pistons adapted to fit alternately in said cylinders, and a valve stem attached to the valve by a swivel joint, whereby the valve is adapted to move without revolution into and out of said cylinders, substantially as described.

3. A drain valve comprising a casing provided with a dividing partition having a port and a valve seat and a cylinder concentric with the port, a supplemental casing fitted in said main casing and having a cylinder and valve seat alined with the first named cylinder, and an outlet port above said last named valve seat, a double piston valve having seat contact washers above and below the pistons, and an operating screw stem attached to the valve by a swivel joint, substantially as described.

In testimony whereof I affix my signature in the presence of two witnesses.

GEORGE E. STEPHENSON.

Witnesses:
J. R. STEPHENSON,
J. H. HENDERSON.